United States Patent Office 3,379,711
Patented Apr. 23, 1968

3,379,711
DISAZO-N-PHENYLTHIOMORPHOLINE
DIOXIDE DYES
David J. Wallace and Max A. Weaver, Kingsport, Tenn., assignors to Eastman Kodak Company, Rochester, N.Y., a corporation of New Jersey
No Drawing. Filed May 19, 1965, Ser. No. 457,166
9 Claims. (Cl. 260—152)

ABSTRACT OF THE DISCLOSURE

Water-insoluble azobenzene-azo-phenylene compounds having an N-thiomorpholine-1,1-dioxide group attached to the phenylene coupling component are useful as dyes for hydrophobic textile materials.

---

This invention relates to disazo compounds particularly useful as dyes for textile fibers, yarns and fabrics.

The disazo compounds have the general formula

I

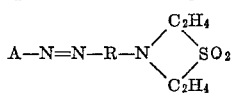

wherein A represents an azobenzene radical such as $C_6H_5N=N-C_6H_4-$ and R represents a monocyclic aromatic radical of the benzene series. The benzene nuclei of the azobenzene radical include phenyl and substituted phenyl groups such as described below. When the compounds are used as textile dyes, radicals A and R are preferably free of groups such as $HO_3SOC_2H_4SO_2-$ and $CH_2=CHSO_2-$ since the presence of these groups can be expected to adversely affect the dyeing of textile fibers especially blends containing mixtures of wool and synthetic fibers. The substituents attached to A and R are not otherwise critical and serve primarily as auxochrome groups to control the color of the disazo compounds.

The disazo compound can also be given the general formula

II

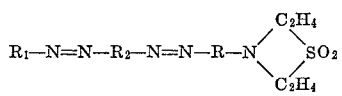

wherein, in the azobenzene radical $R_1-N=N-R_2-$, $R_1$ and $R_2$ can be phenyl or substituted phenyl groups. For example, the benzene radical $R_1$ can be phenyl,
lower alkylphenyl, e.g., o,m,p-tolyl,
lower alkoxyphenoyl, e.g., o,m,p-methoxyphenyl,
halophenyl, e.g., o,m,p-chlorophenyl,
nitrophenyl, e.g., o,m,p-nitrophenyl,
lower alkylsulfonylphenyl, e.g., o,m,p-methylsulfonylphenyl,
lower alkylsulfonamidophenyl, e.g., o,m,p-methylsulfonamidophenyl,
lower di(alkylsulfonyl)phenyl, e.g., 2,5-di(methylsulfonyl)phenyl,
dicarboxylicacidimidophenyl, e.g., o,m-succinimidophenyl,
lower fluoroalkylphenyl, e.g., trifluoromethylphenyl,
lower alkanoylamidophenyl, e.g., o,m,p-acetamidophenyl,
cyanophenyl, e.g., o,m,p-cyanophenyl,
carboxamidophenyl, e.g., o,m,p-carboxamidophenyl,
benzamidophenyl,
thiocyanophenyl, e.g., o,m,p-thiocyanophenoyl,
lower alkylthiophenyl, e.g., o,m,p-methylthiophenyl,
benzaminophenyl, e.g., o,m,p-benzaminophenyl,
benzylaminophenyl, e.g., o,m,p-benzylaminophenyl,
N-alkylbenzaminophenyl, e.g., N-phenylmethylaminophenyl,
lower formylphenyl, e.g., o,m,p-formylphenyl,
carbalkoxyphenyl, e.g., o,m,p-carbethoxyphenyl, and
benzoylphenyl, e.g., o,m,p-benzoylphenyl.

R and $R_2$ each represents p-phenylene or p-phenylene substituted in the 2- or 3-positions with lower alkyl, e.g. 3-methyl-p-phenylene, 2-methyl-p-phenylene; lower alkoxy, e.g. 3-methoxy-p-phenylene, 2,5-dimethoxy-p-phenylene; halogen, e.g. 3-chloro-p-phenylene; lower alkylthio, e.g. 3-methylthio-p-phenylene; lower alkanoylamido, e.g. 3-acetamido-p-phenylene; or lower alkylsulfonamido, e.g. 3-methyl-sulfonamido-p-phenylene. The positions on the p-phenylene group represented by R are numbered with reference to the point at which the thiomorpholine-1, 1-dioxide group is attached.

In radicals R, $R_1$ and $R_2$ the alkyl groups are preferably lower alkyl of 1 to 4 carbon atoms.

The disazo compounds can be prepared, as described in detail in the examples below, by coupling diazotized aminoazobenzene compounds with N-phenylthiomorpholine dioxide couplers having the formula

III

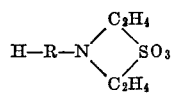

wherein R has the meaning given above. The dioxides III are prepared by reaction of divinyl sulfone with a variety of aniline derivatives $RNH_2$ as described in the examples below.

Representative dioxide couplers are N-phenylthiomorpholine dioxide, N-(m-methylphenyl)thiomorpholine dioxide means meta to morpholino N-atom, N-(m-chlorophenyl)thiomorpholine dioxide, N-(m-methoxyphenyl)thiomorpholine dioxide, N-(3,6-dimethoxyphenyl)thiomorpholine dioxide, N-(3-acetamido-6-methoxyphenyl)thiomorpholine dioxide, N-(3-methoxy-6-methylphenyl)thiomorpholine dioxide.

The azo compounds can be used for dyeing textile materials including synthetic polymer fibers, yarns and fabrics giving a variety of fast shades when applied thereto by conventional dyeing methods. The azo compounds have moderate affinity for cellulose ester and polyamide fibers. When the azo compounds are used for dyeing such hydrophobic materials, they should be free of water-solubilizing groups such as sulfo and carboxyl. In general the dyes have good fastness, for example, to light, washing, gas (atmospheric fumes) and sublimation.

The following examples will serve to illustrate the preparation of representative intermediates and azo compounds of our invention.

EXAMPLE 1

A. Preparation of the coupler

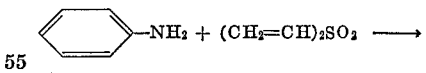

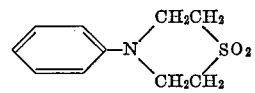

46.5 g. (0.5 m.) aniline and 59.0 g. (0.50 m.) divinyl sulfone were stirred and heated on the steam bath for three hours. The mixture was cooled and 750 cc. 6% HCl was added. Steam was blown through until the mixture boiled and solution was almost complete. The above product crystallized out on cooling. The white solid was filtered off, washed with water, and dried. M.P. 118–120° C.

B. Preparation or the dye 1.8 g. dry $NaNO_2$ was dissolved in 12.5 ml. conc. $H_2SO_4$. This solution was cooled to about 5° C. and 25 ml. 1:5 acid was added below 10° C. Then 5.97 g. 1-amino-2,5,2'-trimethylazobenzene was added, followed by 25 ml. 1:5 acid (5 parts acetic to 1 part propionic acid). The reaction mixture was stirred two hours at ice-bath temperature, then added to a cold solution of 5.03 g. N-phenylthiomorpholine-S-dioxide in 50 ml. 1:5 acid. The coupling mixture was neutralized to brown on Congo red paper using solid ammonium acetate. After coupling 2 hours, the mixture was drowned in water, filtered, washed with water and dried. The product dyed polyester and nylon fibers an orange shade of excellent fastness properties.

The product has the formula

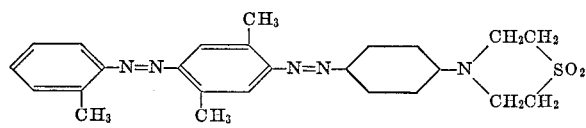

EXAMPLE 2

1.8 g. dry NaNO$_2$ was dissolved in 12.5 ml. conc. H$_2$SO$_4$. This solution was cooled to about 5° C. and 25 ml. 1:5 acid was added below 10° C., followed by 4.9 g. 4-aminoazobenzene. Then 25 ml. 1:5 acid was added and the reaction mixture stirred two hours at ice-bath temperature. It was then added to a cold solution of 5.03 g. N-phenylthiomorpholine-S-dioxide in 50 ml. 1:5 acid. The coupling mixture was neutralized to brown on Congo red paper using solid ammonium acetate. After coupling two hours, the mixture was drowned in water, filtered, washed with water, and dried. The product dyed polyester and nylon fibers a yellow shade of excellent fastness properties.

EXAMPLE 3

The coupler, N-(m-tolyl)thiomorpholine dioxide, was made as in Example 1, substituting an equimolar amount of m-toluidine for aniline. The product melts 90–91.5° C.

The process of Example 2 is carried out except using 5.38 g. N-(m-tolyl)thiomorpholine dioxide as the coupler. The product dyes polyester and nylon fibers a reddish-yellow shade of excellent fastness properties.

EXAMPLE 4

The process of Example 2 is carried out except using 5.6 g. o-aminoazotoluene as the source of the diazonium component and 5.38 g. N-(m-tolyl)thiomorpholine dioxide as the coupler. The product dyes polyester and nylon fibers an orange shade of excellent fastness properties.

EXAMPLE 5

The process of Example 2 is carried out except using 5.73 g. 4-amino-3-chloroazobenzene as the source of the diazonium component and 5.38 g. N-(m-tolyl)thiomor-pholine dioxide as the coupler. The product dyes polyester and nylon fibers a reddish-yellow shade of excellent fastness properties.

EXAMPLE 6

The process of Example 2 is carried out except using 4-amino - 2,5 - dimethoxy-3'-propionamidoazobenzene as the source of the diazonium component and N-(m-tolyl) thiomorpholine dioxide as the coupler. The product dyes polyester and nylon fibers a red shade of excellent fastness properties.

The diazo compounds of Formula II described in the examples of the following table are prepared in the manner of the above examples by coupling the indicated aminoazo benzene with the indicated N-phenylthiomorpholine dioxide. The color is that obtainable on dyeing polyester fibers.

| Example No. | Substituents on Radical R$_1$ | Substituents on Radical R$_2$ | R | Color |
|---|---|---|---|---|
| 7 | None | None | m-tolylene | Orange. |
| 8 | 2-CH$_3$ | 2-CH$_3$ | do | Do. |
| 9 | 4-CH$_3$ | 3-CH$_3$ | m-Cl-phenylene | Yellow. |
| 10 | 3-CH$_3$ | 3-CH$_3$-6-OCH$_3$ | m-Tolylene | Red. |
| 11 | 4-OCH$_3$ | 3-Cl | m-Tolylene | Red. |
| 12 | 4-SO$_2$NH$_2$ | 2-Cl | 3-NHCOCH$_3$-phenylene | Orange. |
| 13 | 4-NO$_2$ | 3-NHCOCH$_3$ | do | Red. |
| 14 | 4-NHCOCH$_3$ | 3,6-di-CH$_3$ | do | Red. |
| 15 | 4-SO$_2$CH$_3$ | 3,6-di-CH$_3$ | do | Red. |
| 16 | 3-CH$_2$OH | 3,6-di-CH$_3$ | do | Orange. |
| 17 | 4-N(CH$_3$)$_2$ | 3,6-di-CH$_3$ | do | Red. |
| 18 | None | None | 3,6-di-OCH$_3$-phenylene | Red. |
| 19 | do | do | m-Tolylene | Orange. |
| 20 | do | do | do | Do. |
| 21 | do | do | 0-Tolylene | Yellow. |
| 22 | 4-CN | 3-CH$_3$ | 3-Tolylene | Orange. |
| 23 | 4-CONH$_2$ | 3-CH$_3$ | do | Do. |
| 24 | 4-CO$_2$C$_2$H$_5$ | 3-CH$_3$ | do | Do. |
| 25 | 4-SO$_2$N(CH$_3$)$_2$ | 3-CH$_3$ | do | Do. |
| 26 | 2-Cl-4-NO$_2$ | 3-CH$_3$ | do | Do. |
| 27 | 4COCH$_3$ | 3-CH$_3$ | do | Do. |
| 28 | 4-CF$_3$ | 3-NHCOCH$_3$ | do | Red. |
| 29 | 2,4-di-Cl | 3-NHCOCH$_3$ | do | Orange. |
| 30 | 4-COC$_6$H$_5$ | 3-CH$_3$ | do | Do. |
| 31 | 3-NHCOC$_6$H$_5$ | 3-CH$_3$ | m-Cl-phenylene | Yellow. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,-745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble disazo compound having the formula

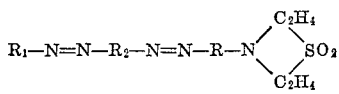

wherein
$R_1$ represents a monocyclic aromatic radical free of sulfoalkylsulfonyl or vinylsulfonyl groups; and
R and $R_2$ each represents p-phenylene or p-phenylene substituted with lower alkyl, lower alkoxy, halogen, lower alkylthio, lower alkanoylamido, or lower alkylsulfonamido.

2. A water-insoluble disazo compound according to claim 1 wherein $R_1$ represents phenyl or phenyl substituted with lower alkyl, lower alkoxy, halogen, nitro, lower alkylsulfonyl, lower alkylsulfonamido, trifluoromethyl, lower alkanoyl, lower alkanoylamido, cyano, carboxamido, thiocyano, lower alkylthio, lower carbalkoxy, or sulfamoyl.

3. A water-insoluble disazo compound according to claim 1 wherein
$R_1$ represents phenyl, lower alkylphenyl, lower alkoxyphenyl, lower alkanoylphenyl, lower alkanoylamidophenyl, sulfamoylphenyl, nitrophenyl, lower alkylsulfonylphenyl, cyanophenyl, carboxamidophenyl, lower carbalkoxyphenyl, halonitrophenyl, or trifluoromethylphenyl;
$R_2$ represents, with respect to the azo group to which R is attached, p-phenylene, 2-methyl-p-phenylene, 3-methyl-p-phenylene, 2-chloro-p-phenylene, 3-chloro-p-phenylene, 3-acetamido-p-phenylene, 2-methoxy 5-methyl-p-phenylene, 2,5-dichloro-p-phenylene, or 2,5-dimethoxy-p-phenylene, and
R represents, with respect to the thiomorpholine-1,1-dioxide nitrogen atom, p-phenylene, 2-methyl-p-phenylene, 3-methyl - p - phenylene, 3-methoxy-p-phenylene, 3 - chloro-p-phenylene, 3-acetamido-p-phenylene, 2,5-dimethoxy-p-phenylene, or 5-acetamido-2-methoxy-p-phenylene.

4. The compound

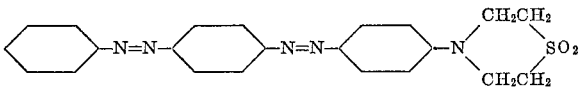

5. The compound

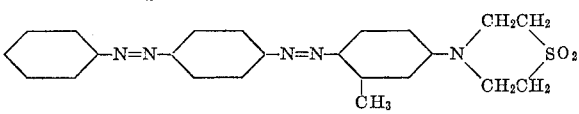

6. The compound

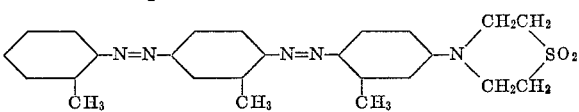

7. The compound

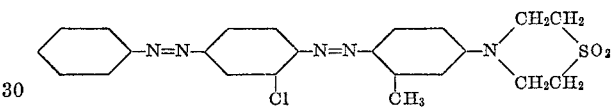

8. The compound

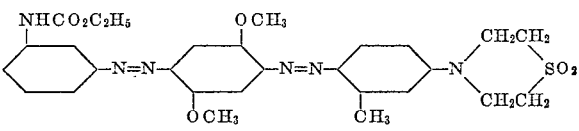

9. The compound

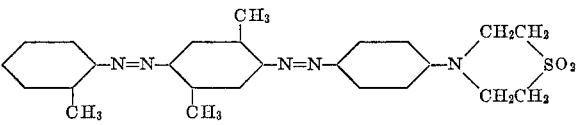

References Cited

UNITED STATES PATENTS

| | | | |
|---|---|---|---|
| 2,186,629 | 1/1940 | Dickey | 260—152 X |
| 2,653,150 | 9/1953 | Mendoza | 260—152 |
| 3,202,657 | 8/1965 | Kuhne et al. | 260—152 X |

FOREIGN PATENTS 1,250,750 12/1960 France.

CHARLES B. PARKER, *Primary Examiner.*

FLOYD D. HIGEL, *Examiner.*